Oct. 17, 1967   J. N. BROWNING   3,347,490
LEVEL WIND FOR AIRBORNE TRAILING WIRE ANTENNA
PARALLEL TO THE DRUM AXIS
Filed Feb. 16, 1966

INVENTOR.
JAMES N. BROWNING
BY Marvin Moody
ATTORNEY

United States Patent Office 3,347,490
Patented Oct. 17, 1967

---

3,347,490
LEVEL WIND FOR AIRBORNE TRAILING WIRE ANTENNA PARALLEL TO THE DRUM AXIS
James N. Browning, Richardson, Tex., assignor to Collins Radio Company, Cedar Rapids, Iowa, a corporation of Iowa
Filed Feb. 16, 1966, Ser. No. 527,883
2 Claims. (Cl. 242—158.3)

ABSTRACT OF THE DISCLOSURE

"The invention discloses an airborne trailing wire antenna which includes a level wind guide for a reel to lay on and pay out line and a second guide which moves at one-half the velocity of the level wind guide so as to eliminate velocity variations of line due to movement of the level wind."

---

This invention relates in general to a level wind mechanism for winding line or wire on a reel.

At times it is necessary to store wire or other flexible materials on a storage drum and to periodically wind and unwind them. Trailing wire antennas are formed by unreeling a wire or cable from an aircraft after it is airborne. For example, in a particular application, a cable with a drogue weighing 200 pounds is used as a trailing wire antenna and tensions up to 1,000 pounds can exist in the cable when fully extended. The cable must be reeled in and out in a smooth fashion. Normal pay-out devices for feeding wire or cable to or from a reel tend to cause pulsations in the cable due to variations in velocity of the cable take-up or pay-out speed. This is because the normal level wind which moves longitudinally of the reel does not have a constant amount of cable between it and the pay-out pulley.

It is an object of this invention, therefore, to eliminate pulsations due to speed changes in the cable pay-out because of the action of the level wind mechanism.

Another object is to provide a level wind mechanism for a reel in which the pay-out and take-up speeds of the line do not vary as a function of the position of the level wind mechanism.

Another object is to provide an improved reel.

A feature of this invention is found in the provision for a level wind mechanism for a reel which has a pair of pulleys, the first of which traverses the entire length of the reel to lay cable onto the reel and a second pulley which travels only a portion of the length of the reel in a manner so as to compensate for the non-linear velocity imparted to the cable by the first level wind device.

Further objects, features, and advantages of this invention will become apparent from the following description and claims when read in view of the accompanying drawings, in which:

Figure 3:
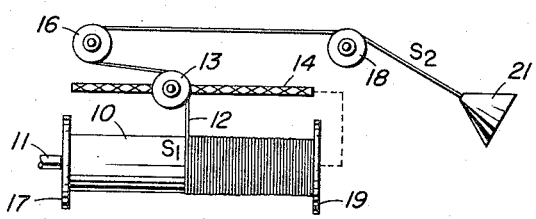

As shown in FIGURE 3, a conventional drum or reel 10 mounted on shaft 11 carries a cable 12 which passes over a level wind pulley 13. The level wind pulley 13 is supported on a two-way lead screw 14 by a suitable follow block. The lead screw 14 is geared to the drum 10 in a fashion such that as the reel and lead screw shaft are rotated, the level wind pulley 13 moves from one end of the reel to the other in an oscillatory fashion to lay-on or pay-out cable from the reel. This assures level winding of the reel rather than allowing the cable to build up at one point on the drum and becoming fouled. The wire passes from level wind pulley 13 over a fixed pulley 16 rotatably supported adjacent one end 17 of the drum 10 and to a second fixed pulley 18 adjacent the other end 19 of the drum.

If the speed of the wire leaving the reel is designated $S_1$ and the speed of the wire leaving the pulley 18 is designated $S_2$, it will be seen that:

$$S_2 = S_1 + \frac{dL}{dT}$$

where L is the length from fixed pulley 18 to the tangent point of the cable on drum 10.

It is seen from observation that when the level wind pulley 13 is moved to the right relative to FIGURE 3 that L is increasing, whereas when the level wind pulley is moving to the left relative to FIGURE 3, the length L is decreasing. Thus, when the reel speed is constant, the speed $S_2$ changes each time the pulley 13 changes direction. The changes in speed in the wire passing over the pulley 18 cause pulsations in the cable which are objectionable. For example, if a drogue 21 is attached to the end of the cable, the length of the cable from the pulley 18 to the drogue will act as a spring with a mass at the end which is capable of vibrating at some resonant frequency. If the pulsations in the cable occur at the resonant frequency or some harmonic thereof, a disastrous condition can exist. Thus, it is desired to eliminate pulsations in the cable caused by changes in the velocity $S_2$ resulting from the conventional level wind.

Figure 1:
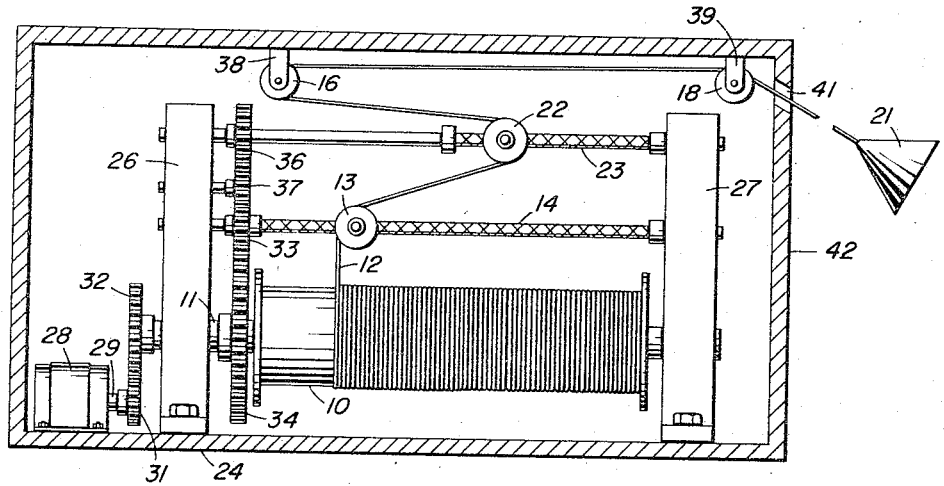
FIGURE 1 is a side view of the level wind mechanism of this invention.

This is accomplished by the invention shown in FIGURES 1 and 2.

The structure of FIGURE 3 has been modified by the addition of a second level wind pulley 22 which is carried on a suitable block that moves on a second reversible lead shaft 23. The shaft 23 is supported adjacent shaft 14 and is geared to shaft 14 and reel 10. The pitch and/or the speeds of shafts 14 and 23 are chosen such that the second level wind pulley 22 moves at one-half the speed of the level wind pulley 13. The level wind pulleys 13 and 22 are also synchronized such that both pulleys are at the extreme right end of their respective shafts and at the extreme left ends of their respective shafts at the same time. Pulley 22 moves at one-half the speed of pulley 13, and the threaded portion of shaft 23 is only one-half the length of shaft 14. Also, the pulley 22 moves back and forth over only the right half of shaft 14 relative to FIGURES 1 and 2. The cable 12 passes from drum 10 over first level wind pulley 13, over second level wind pulley 22 to fixed pulley 16 and then over output pulley 18.

Once again designating the velocity of the cable as it leaves the reel as $S_1$ and the velocity of the cable as it leaves fixed pulley 18 as $S_2$, it will be seen that the distance from pulley 18 to the point of the cable tangent to the reel remains constant with the structure of FIGURES 1 and 2.

$$S_2 = S_1 + \frac{dL_2}{dT} - \frac{2dL_1}{dT}$$

wherein dL/dT is the velocity of pulley 13 and $dL_2/dT$ is the velocity of pulley 22.

Since $$\frac{dL_2}{dT} = \frac{2dL_1}{dT}$$

the pulsations in the cable are eliminated.

FIGURE 2 illustrates various positions of the pulleys 22 and 13 and in each case the length of cable from the pulley 16 to the drum 10 remains constant. For example, FIGURE 2a illustrates the condition when both pulleys 22 and 13 are at right end relative to the figure, and the major portion of the length of the cable between pulleys 16 and 13 is between pulleys 16 and 22.

Figure 2A:
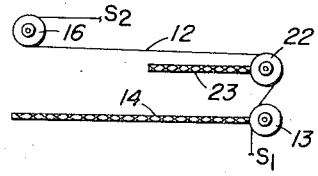
FIGURE 2a through 2e illustrates the relative positions of the level wind pulleys during operation; and, FIGURE 3 illustrates the conventional prior art level wind mechanism.
Figure 2D:
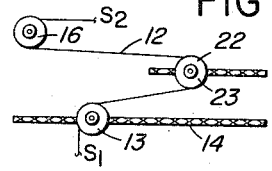
Figure 2B:
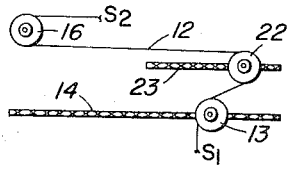
Figure 2E:
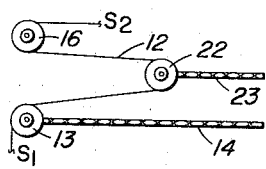
Figure 2C:
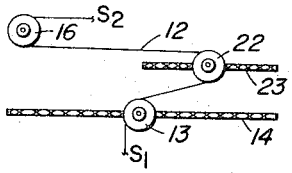

FIGURE 2c, on the other hand, illustrates the situation when pulleys 22 and 13 are at the full left position and at that time half the cable between pulleys 16 and 13 is between pulley 16 and pulley 22 and the other half is between pulleys 22 and 13. FIGURES 2b, 2c, and 2d illustrate intermediate positions and at all times the length of cable between pulleys 16 and 13 remains constant.

FIGURE 1 illustrates a container 24 which has a pair of standoffs 26 and 27 which rotatably support the reel shaft 11 and the lead shafts 14 and 23. A motor 28 is attached to the container 24 and carries an output shaft 29 with a gear 31 which is in mesh with a gear 32 on the reel shaft 11. Lead screw shaft 14 carries a gear 33 which is in mesh with a gear 34 on the reel shaft 11. The second level wind shaft 23 is driven by gears 36 and 37. Gear 36 is mounted on shaft 23 and is in mesh with gear 36 which is rotatably supported from standoff 26 and meshes with gear 33. The shaft 23 rotates at one-half the speed of shaft 14 due to the selected gear ratio. The pulleys 13 and 22 are rotatably mounted on carrier blocks which are threaded on shafts 14 and 23, respectively. Pulleys 16 and 18 are mounted on the container at opposite ends of drum 10 by brackets 38 and 39. An opening 41 is formed in the end 42 of container 24 to allow the cable to pass in and out. The drogue 21 is connected to the end of the cable.

It is seen that this invention provides a level wind mechanism which eliminates variations in velocity between the input and output of the reeling mechanism and although it has been described with respect to a particular embodiment thereof, it is not to be so limited, as changes and modifications may be made therein which are within the spirit and scope of the invention as defined by the appended claims.

I claim:
1. A reeling mechanism comprising a supporting means, a reel rotatably supported by the supporting means, a drive means connected to drive said reel, a line wound about said reel, a pay out means attached to said supporting means and said line passing through the pay out means, a level wind guide comprising a shaft threaded in both directions with a carrier mounted thereon, said shaft mounted parallel to the axis of rotation of the reel on the supporting means and geared to the reel so that the carrier moves back and forth along the longitudinal axis of the reel as the reel is driven by the driving means, a second guide comprising a second shaft parallel to the first mentioned shaft with a second carrier mounted thereon said second shaft rotatably supported by the support means and geared to the reel and the first mentioned shaft so as to be driven thereby, said second shaft threaded in both directions and the threaded portions being half the length of the threaded portion of the first mentioned shaft and at a pitch so that the carrier on the second shaft moves at one half the speed of the carrier on the first mentioned shaft and the line passing from said reel over the carrier on the first mentioned shaft and over the second carrier and to the pay out means.

2. In apparatus according to claim 1 wherein the pay out means and the carriers on the first mentioned shaft and the second shaft are pulleys.

References Cited

UNITED STATES PATENTS

| | | | |
|---|---|---|---|
| 2,524,623 | 10/1950 | Colombu | 242—18 |
| 2,876,963 | 3/1959 | Se Leque et al. | 242—54 XR |

FOREIGN PATENTS 993,992   6/1965   Great Britain.

S. N. GILREATH, *Examiner.*

STANLEY N. GILREATH, *Primary Examiner.*